(12) United States Patent
Yamato

(10) Patent No.: US 6,414,939 B1
(45) Date of Patent: Jul. 2, 2002

(54) ROUTER APPARATUS AND CONTROL-FRAME PROCESSING METHOD

(75) Inventor: Katsumi Yamato, Chiba-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/148,697

(22) Filed: Sep. 4, 1998

(30) Foreign Application Priority Data

Sep. 5, 1997 (JP) .............................................. 9-241155

(51) Int. Cl.$^7$ ............................................... G01R 31/08
(52) U.S. Cl. ..................................... 370/236.1; 370/397
(58) Field of Search ............................. 370/236.1, 397, 370/395.21, 389, 390, 445

(56) References Cited

U.S. PATENT DOCUMENTS

| | | | |
|---|---|---|---|
| 4,539,677 A | * 9/1985 | Lo ................................ | 370/445 |
| 5,991,268 A | * 11/1999 | Awdeh et al. ............. | 370/236.1 |
| 6,046,983 A | * 4/2000 | Hasegawa et al. ........ | 370/236.1 |
| 6,094,431 A | * 7/2000 | Yamato et al. .......... | 370/395.21 |
| 6,172,991 B1 | * 1/2001 | Mori .......................... | 370/389 |
| 6,226,265 B1 | * 5/2001 | Nakamichi et al. ..... | 370/395.21 |
| 6,252,875 B1 | * 6/2001 | Katuyosi .................... | 370/390 |

OTHER PUBLICATIONS

Perkins, "The Point–to–Point Protocol Tranmissio of Multi–Protocol Datagrams Over Point Links" *Network Working Group* (1990).

Heinanen, "Multiprotocol Encapsulation Over ATM Adaptation Layer 5 Status of this Memo" *Network Working Group* (1993).

Rekhter, "Cisco Systems' Tag Switching Architecture Overview Status of this Memo" *Network Working Group* (1997).

* cited by examiner

*Primary Examiner*—Salvatore Cangialosi
(74) *Attorney, Agent, or Firm*—Foley & Lardner

(57) ABSTRACT

The router, which serves as an egress of a first network, forms a frame out of a control frame, which is received through a virtual connection in the first network and is to be terminated at the router, and transmits the frame to a second network, i.e., to external of the first network. The router also forms a frame out of a data frame, which is received through the same virtual connection and is to be transferred through the router, and transfers the frame to the second network. The router, which serves as an ingress of a third network, receives the frame including the control frame, is able to change the information contained in another control frame to be transferred within the third network, based on the control information generated in the first network and contained in the received frame. Thus, each node in the networks can perform packet transfer control based not only on control/congestion information of its own network but also on control/congestion information of other networks.

20 Claims, 8 Drawing Sheets

| Virtual Connection Identifier | Ethernet Frame Information | | |
|---|---|---|---|
| | MAC address | DVLI value | -------------- |
| v a | m a | d a | |
| v b | m b | d b | |
| v c | m c | d c | |
FIG. 9
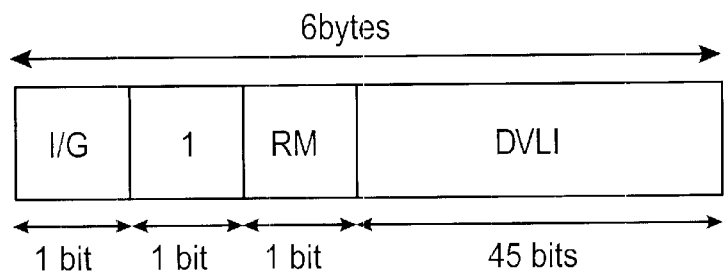
FIG. 10
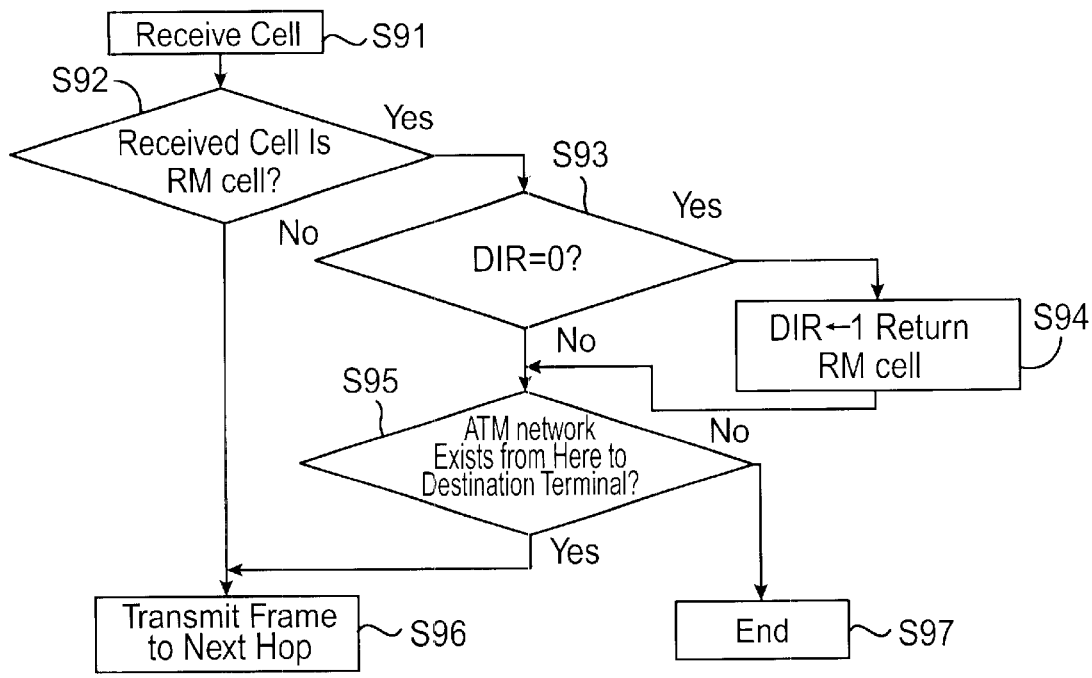
FIG. 11

ROUTER APPARATUS AND CONTROL-FRAME PROCESSING METHOD

BACKGROUND ART

The present invention relates to a router that connects different types of communication networks, such as an Asynchronous Transfer Mode (ATM) network, Ethernet, and point-to-point link, and that performs a frame transfer operation. The invention is also concerned with a control-frame processing method in the router.

Routers, which are used for connecting communication networks, transfer datagrams from one communication network to another communication network. A datagram includes not only communication information to be transferred, but also network-layer addresses (which are the Internet Protocol (IP) addresses if communications are carried out by IP), such as a source address and a destination address. The router determines the output interface and the transfer target node (a router or a terminal) by using the address information contained in the datagram.

Upon receiving from one communication network a datalink frame (for example, an Ethernet frame) defined in the datalink layer (for example, the Media Access Control (MAC) layer), the router performs predetermined processing on the frame in the datalink layer, and then converts it into a packet that can be handled in the network layer. Subsequently, the router determines an output interface of the packet and a network-layer address of the transfer target (i.e., next hop) node according to the network-layer destination address of the packet, and then delivers the packet to the determined output interface. Thereafter, the output interface determines the datalink-layer address according to the network-layer address of the next hop node, and constructs a datalink frame, which is then output to another communication network.

In order to reduce the long processing time and heavy processing load in the above transfer of a datalink frame, which requires predetermined processing in the network layer, the following type of router is being considered. In this router, the received datalink frame can be transferred without needing to convert the frame into a packet and without needing to perform predetermined processing in the network layer. This can be achieved as follows. In this router, virtual data links that handle only specific flows are defined, and an identifier of a virtual data link is assigned to each specific flow.

Then, the router stores the relationship between the identifier of the virtual data link and information for identifying the next hop node to which frames belonging to the specific flow is to be transferred as a lookup table. By referring to the lookup table based on the identifier contained in a specific region of the received datalink frame, the router can obtain the information that identifies the next hop node and then transfer the frame to the next hop node.

In the aforementioned network environment in which communications are performed via routers, the following control factors are essential to perform packet transfer with a guarantee that packet transfer delay and/or packet loss rate will be less than some threshold: packet transfer control performed in the network layer by the packet transmitting terminal and the router, and frame transfer control performed in the datalink layer by each communication network. If the above-mentioned type of router is adopted, packet transfer control in the network layer is not performed in the router. Accordingly, only frame transfer control performed in the datalink layer by each communication network (and packet transfer control performed in the network layer by the packet transmitting terminal) is executed. Since frame transfer control is independently performed in each communication network, control information possessed by a certain communication network cannot be recognized by another communication network. As a consequence, the packet transfer control over a plurality of networks for the above-described guarantee may not be sufficiently performed.

A network environment illustrated in FIG. 1A or 1B is now considered. Packet transfer is being performed from a terminal a(11) to a terminal b(12). A virtual connection for providing Available Bit Rate (ABR) service is established in an ATM network a(15), and through the virtual connection, the terminal a(11) transmits cells to a router c(113). Also a virtual connection for providing ABR service is established in an ATM network b(16), and through the virtual connection, a router d(114) transfers (transmits) the cells to the terminal b(12). In providing the ABR service, a Resource Management (RM) cell including network resource information (e.g., transfer control information, congestion information) is returned to the corresponding source node of the ABR connection within each ATM network, and the resource information in one ATM network is not disclosed to another ATM network, as shown in FIG. 1A or 1B.

This may be because the communication network connecting the router c and the router d is not an ATM network and is thus unable to provide the ABR service. In the example shown in FIGS. 1A and 1B, as the communication network connecting the routers c and d, the Ethernet 17 and the point-to-point link using Point-to-Point Protocol (PPP) (hereinafter referred to as "PPP link") 18 are respectively employed.

For example, a presence of congestion in the ATM network b(16) can be recognized by the router d(114), and then the router d(114) decreases the cell transfer rate regarding data to be transferred to the ATM network b(16). In contrast, the presence (or the absence) of congestion in the ATM network b cannot be recognized by the router c(113), which serves as a node outputting the data from the ATM network a(15). Accordingly, the router c does not reduce the transfer rate of datalink frames that are to be transferred through the Ethernet 17 (or the PPP link 18). This increases the number of frames accumulated in the router d(114) that receives the frames from the Ethernet 17 (or the PPP link 18), which may cause frame loss due to the overflow of a buffer in the router d.

As described above, since transfer control in the datalink layer is independently performed within each communication network, the transfer quality over a plurality of networks may be degraded.

DISCLOSURE OF THE INVENTION

It is therefore an object of the present invention to provide a mechanism for exchanging, between one communication network and another communication network, information for transfer control within each communication network, so as to achieve higher transfer quality.

According to one aspect of the present invention, there is provided a network interconnection apparatus for connecting a first network and a second network, comprising: a memory configured to store an identifier of a virtual connection in the first network to be used in receiving a frame belonging to a specified flow and corresponding information for designating a neighboring node in the second network to which the frame from the virtual connection is to be transferred; a transfer unit configured to transfer the frame from the virtual connection to the neighboring node by referring to the memory at a layer lower than a network layer; and a control-frame processing unit configured to terminate a control frame received from the virtual connection so as to perform resource management in a datalink layer within the first network, and configured to create a copy of the control frame so as to transfer the copy of the control frame to the neighboring node through the transfer unit.

According to another aspect of the present invention, there is provided a network interconnection apparatus for connecting a first network and a second network, comprising: a memory configured to store an identifier of a virtual data link dedicated to a specified flow in the first network and a corresponding identifier of a virtual connection to a neighboring node in the second network; a receiving unit configured to receive a frame including a control frame with the identifier of the virtual data link from the first network, the control frame generated in a third network where resource management in a datalink layer is performed according to the control frame; and a control-frame processing unit configured to transmit another control frame to the neighboring node through the virtual connection so as to perform resource management in the datalink layer within the second network, and configured to determine information to be written into said another control frame according to said control frame included in the frame received by the receiving unit.

According to yet another aspect of the present invention, there is provided a method of processing a control frame at a boundary of first and second networks, the method comprising steps of: storing, in a memory, an identifier of a virtual connection in the first network to be used in receiving a frame belonging to a specified flow and corresponding information for designating a neighboring node in the second network to which the frame from the virtual connection is to be transferred; terminating a control frame received from the virtual connection so as to perform resource management in a datalink layer within the first network, while creating a copy of the control frame; and transferring the copy of the control frame to the neighboring node by referring to the memory at a layer lower than a network layer.

According to yet another aspect of the present invention, there is provided a method of processing a control frame at a boundary of first and second networks, the method comprising steps of: storing, in a memory, an identifier of a virtual data link dedicated to a specified flow in the first network and a corresponding identifier of a virtual connection to a neighboring node in the second network; receiving a frame including a control frame with the identifier of the virtual data link from the first network, the control frame generated in a third network where resource management in a datalink layer is performed according to the control frame; and transmitting another control frame to the neighboring node through the virtual connection so as to perform resource management in the datalink layer within the second network, while determining information to be written into said another control frame according to said control frame included in the received frame.

According to yet another aspect of the present invention, there is provided a method of processing a control frame to be transferred in a forward direction in a network system including first, second, and third networks, the method comprising steps of: storing, in a first memory at an egress of the first network, an identifier of a first virtual connection in the first network to be used in receiving a frame belonging to a specified flow and corresponding information for designating a next hop node in the second network to which the frame from the first virtual connection is to be transferred; returning a first control frame received from the first virtual connection so as to perform resource management in a datalink layer within the first network, while creating a copy of the first control frame, at the egress of the first network; transferring a frame including the copy of the first control frame and another frame from the first virtual connection in the first network to the next hop node in the second network by referring to the first memory at a layer lower than a network layer; storing, in a second memory at an ingress of the third network, an identifier of a virtual data link dedicated to the specified flow in the second or other network and a corresponding identifier of a second virtual connection for the specified flow in the third network; receiving said frame including the copy of the first control frame with the identifier of the virtual data link from the second or other network and transmitting a second control frame onto the second virtual connection so as to perform resource management in the datalink layer within the third network, while determining information to be written into the second control frame according to the first control frame, at the ingress of the third network; and transferring said another frame with the identifier of the virtual data link onto the second virtual connection by referring to the second memory at a layer lower than a network layer.

According to yet another aspect of the present invention, there is provided a method of processing a control frame to be transferred in a backward direction in a network system including first, second, and third networks, the method comprising steps of: storing, in a first memory at an ingress of the third network, an identifier of a first virtual connection in the third network to be used in receiving a frame belonging to a specified flow and corresponding information for designating a neighboring node in the second network to which the frame from the first virtual connection is to be transferred; terminating a first control frame received from the first virtual connection so as to perform resource management in a datalink layer within the third network, while creating a copy of the first control frame, at the ingress of the third network; transmitting a frame including the copy of the first control frame to the neighboring node in the second network by referring to the first memory; storing, in a second memory at an egress of the first network, an identifier of a virtual data link dedicated to the specified flow in the second or other network and a corresponding identifier of a second virtual connection for the specified flow in the first network; receiving said frame including the copy of the first control frame with the identifier of the virtual data link from the second or other network; and returning a second control frame received from the second virtual connection so as to perform resource management in the datalink layer within the first network, while determining information to be written into the second control frame according to the first control frame, at the egress of the first network.

BRIEF DESCRIPTION OF THE DRAWINGS

FIG. 9 illustrates exemplary contents of a memory indicating the relationship between the virtual connection identifier and the frame information used in forming an RM cell into a frame;

FIG. 10 illustrates an example of an MAC address within a frame formed from an RM cell; and FIG. 11 is a flowchart illustrating an exemplary operation algorithm in an ATM receiving unit in a router.

DESCRIPTION OF THE PREFERRED EMBODIMENT

According to the principle of the present invention, a router has the function of transferring control information within one logical network so that the control information will reach another logical network, where these logical networks may be physically located away from each other. This makes it possible for the components of the networks to perform congestion control while considering not only the congestion status in its own logical network, but also the congestion status in other logical networks.

For example, the router according to the principle of the invention, which serves as an egress of one ATM network, forms a frame out of an RM cell, which is received through a virtual connection and is to be terminated at the router (i.e., originally supposed to be terminated within one ATM network), and transmits the frame to another network (i.e., to external of said one ATM network). The router also forms a frame out of a data cell, which is received through the same virtual connection and is to be transferred through the router to another network (i.e., originally supposed to be transferred beyond the boundary of networks), and transmits the frame to another network.

Upon receiving the frame including the RM cell, the router according to the principle of the invention, which serves as an ingress of another ATM network, is able to change the information contained in another RM cell to be transferred within its own (said another) ATM network based on the control information contained in the received RM cell.

Accordingly, each node in the networks can perform packet transfer control based not only on control/congestion information of its own network but also on control/ congestion information of other networks. Thus, data transfer quality can become higher, since increasing the number of frames accumulated in a buffer at a router that causes a frame loss can be controllable.

Figure 2A:
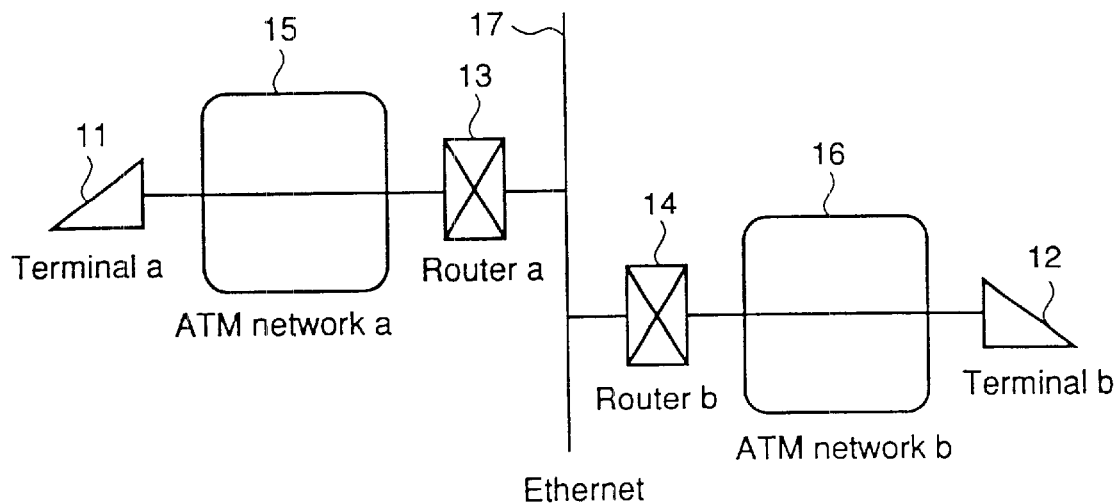
FIGS. 2A and 2B illustrate a basic configuration of an IP packet communication network system where the present invention can be applied.
Figure 2B:
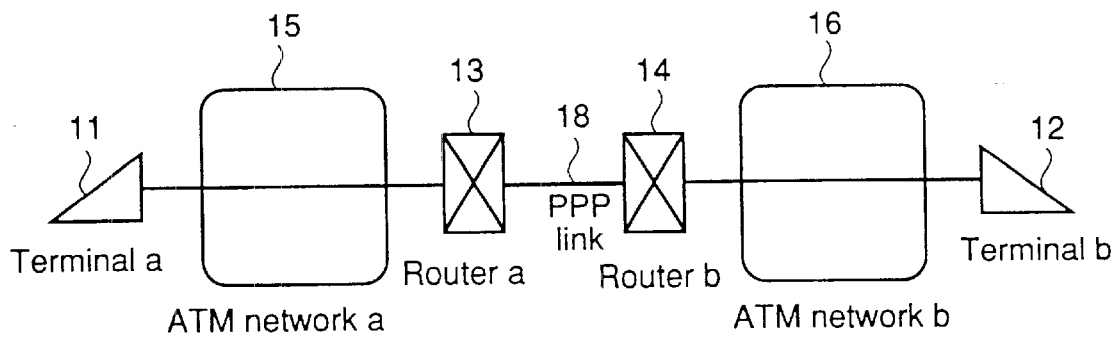

FIGS. 2A and 2B respectively show a basic configuration of an IP packet communication network system. The IP packet represents a packet defined at the IP level. The communication network system shown in FIG. 2A or 2B includes a terminal a(11) which transmits an IP packet, and a terminal b(12) which is the destination of the IP packet and thus receives the IP packet transferred through an ATM network a (15), routers a(13) and b(14), which respectively connect different communication networks, and an ATM network b(16). In FIGS. 2A and 2B, the routers a and b are not connected via an ATM network, but via an Ethernet 17 in FIG. 2A, and via a PPP link 18 in FIG. 2B.

The ATM network-a provides communications between the terminal-a and the router-a, while the ATM network-b provides communications between the router-b and the terminal-b. As stated above, the Ethernet 17 provides communications between the routers a and b in FIG. 2A, while the PPP link 18 provides communications between the routers a and b in FIG. 2B. The router-a connects the ATM network-a and the Ethernet 17 or the PPP link 18, while the router-b connects the Ethernet 17 or the PPP link 18 and the ATM network-b.

In the presence of any IP packet to be transmitted, the terminal-a, which serves as the source node of the IP packet, determines the virtual connection (the virtual connection established to the router-a) based on the information such as the IP address indicating the destination of the packet (the terminal-b). The terminal-a then converts the packet into ATM cells and transmits them to the ATM network-a using the determined virtual connection.

Figure 3A:
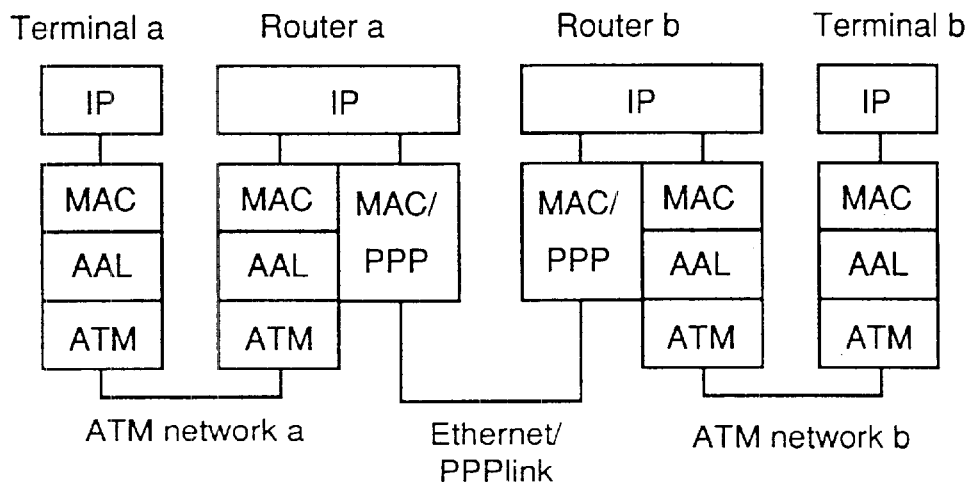
FIGS. 3A and 3B illustrate an exemplary datagram transfer procedure that requires IP processing.
Figure 3B:
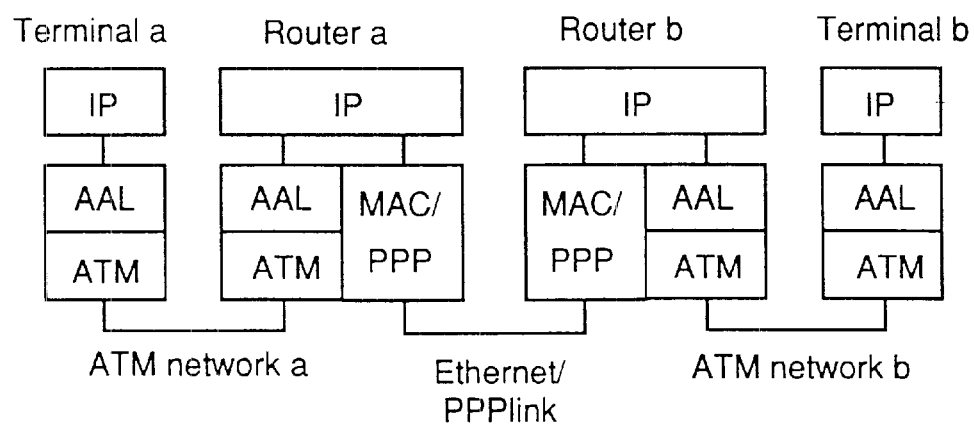
Figure 4A:
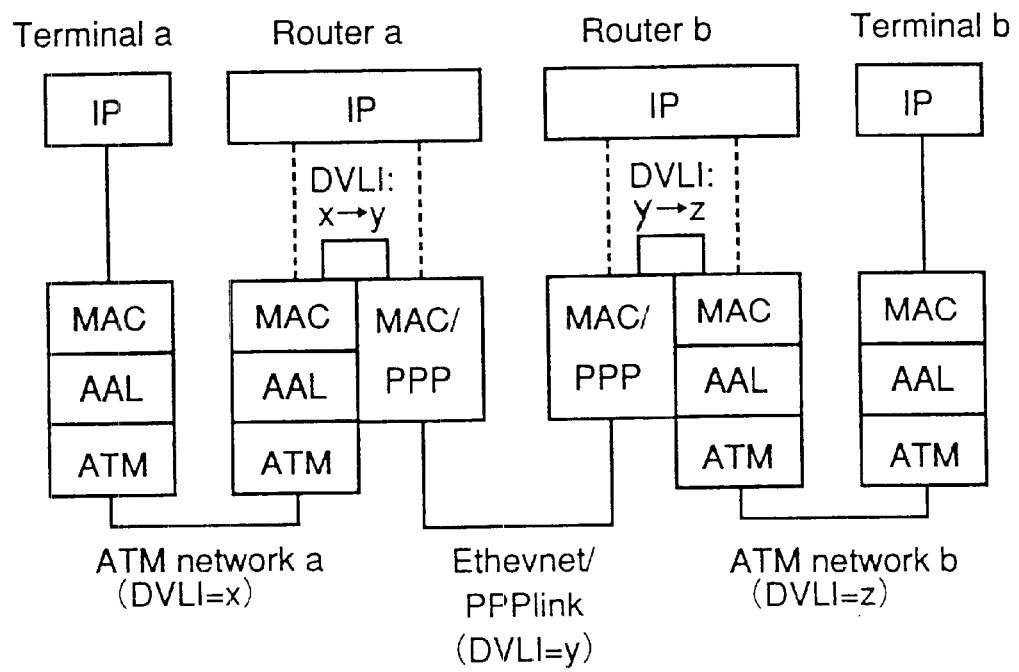
FIGS. 4A and 4B illustrate an exemplary datagram transfer procedure that does not require IP processing.
Figure 4B:
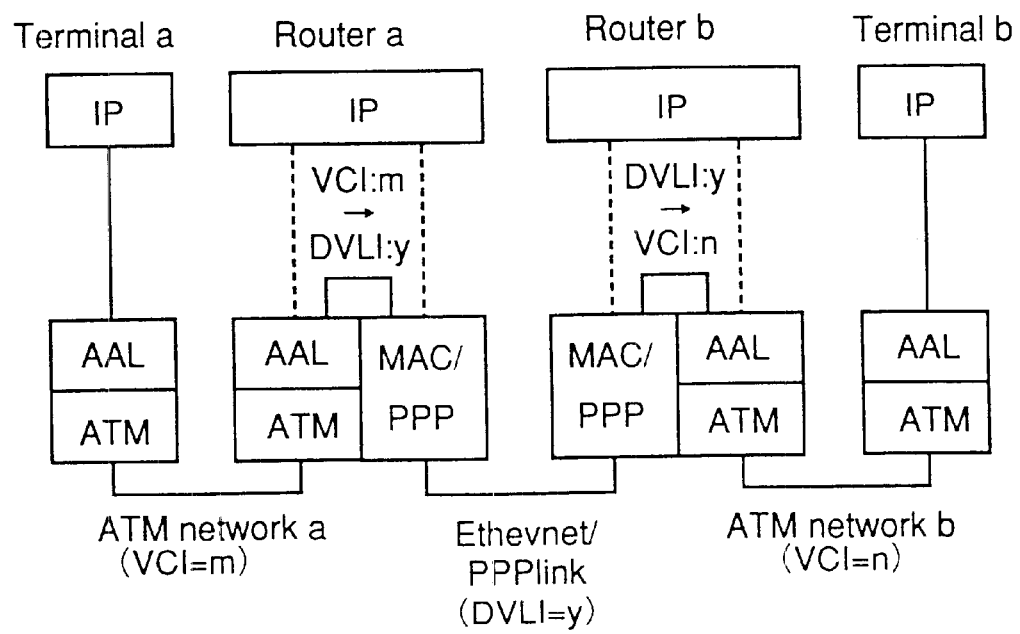

There are basically two types of procedures for transferring the received datagrams at the routers a and b. In one procedure, IP processing is performed, and in the other procedure, IP processing is not performed. FIGS. 3A and 3B illustrate the datagram transfer procedure in which IP processing is performed. FIGS. 4A and 4B illustrate the datagram transfer procedure in which IP processing is not performed. MAC/PPP and Ethernet/PPP link indicated in these figures are suitably selected according to the protocol between the routers a and b.

The datagram transfer procedure that requires IP processing is first described with reference to FIGS. 3A and 3B. The router-a reconstructs the IP packet from the received cells and determines the next hop node (router-b), based on the IP address in the packet indicating the destination of the packet. The router-a then performs predetermined processing in the datalink layer, such a resolution of the MAC address of the router-b, as required. Subsequently, the router-a converts the packet into Ethernet frames and transmits them to the Ethernet 17.

Upon receiving the Ethernet frame having the MAC address addressed to the router-b, the router-b reconstructs the IP packet from the frame and determines the virtual connection (which is established to the terminal-b) based on the IP address of the packet. Thereafter, the router-b converts the packet into ATM cells and transmits them to the ATM network-b using the determined virtual connection.

There are two techniques in transmitting an IP packet to an ATM network. According to one technique, the IP packet is converted into Ethernet frames by performing predetermined processing in the MAC layer and is further converted into cells, as illustrated in FIG. 3A. The cells are then transmitted to the ATM network. According to the other technique, the IP packet is encapsulated according to the prescribed link control information and is then directly converted into cells without performing predetermined processing in the MAC layer, as shown in FIG. 3B. The cells are then transmitted to the ATM network. For the latter method, see Request for Comments (RFC) 1483 of Internet Engineering Task Force (IETF).

If the routers a and b are connected via the PPP link, as illustrated in FIG. 2B, the IP packet is directly transmitted and received on the link via the PPP without being converted into an Ethernet frame (concerning the PPP, see RFC1171 of IETF). In this type of communication, the IP packet to be transmitted to the link is encapsulated according to the PPP.

The datagram transfer procedure that does not require IP processing is now described with reference to FIGS. 4A and 4B. Namely, the datagram is transferred at a layer lower than the IP layer. More specifically, a virtual data link that handle only a specific flow (hereinafter referred to as "Dedicated Virtual Link (DVL)") is defined. An identifier (hereinafter referred to as "DVL Identifier (DVLI)") is then assigned to each DVL. This DVLI may also be called a label, and the router that transfers datagrams according to the DVLIs at a layer lower than layer-3 may be called a label switch. This kind of transfer may also be referred to as "cut-through."

A DVL that accommodates frames belonging to a specific flow is recognized by the router in the following manner. In performing communications via the Ethernet, as illustrated in FIG. 2A, the DVLI may be written as the source MAC address or the destination MAC address within the Ethernet frame. In performing communications via the PPP link, as shown in FIG. 2B, the DVLI may be written as a tag in tag switching (see RFC2105 of IETF).

In the explanation below, the aforementioned datagram transfer procedure by using a virtual data link is implemented in communication networks connected via the Ethernet. However, the following operation can be similarly applied to communications performed via the PPP link. Also, in the explanation below, the DVLI is written into the MAC address field in datalink frames. However, the DVLI may be written into another field, for example, a prescribed field between layer-2 header and layer-3 header, depending on the protocol adopted in the networks.

In transferring/receiving a datagram to/from the ATM network by performing processing in the MAC layer, as shown in FIG. 4A, the router-a temporarily reconstructs an Ethernet frame from the received cells by performing processing in the MAC layer. The router-a then determines the output interface corresponding to the DVLI written in the MAC address field of the frame by referring to the DVLI lookup table, and transmits the frame to the Ethernet 17. In FIG. 4A, since the DVLI of the received frame is x, the router-a obtains y as the output side DVLI that corresponds to DVLI=x, by referring to the lookup table. Thus, the DVLI=y is newly written in the frame, which is then output through the output interface obtained by referring to the lookup table. Thereafter, the router-b determines the output interface corresponding to the DVLI=y written in the received Ethernet frame, and also obtains the virtual connection identifier and the DVLI=z, by referring to a lookup table of the router-b. The DVLI=z is then newly written in the frame, which is then converted into cells and transmitted to the ATM network-b through the virtual connection corresponding to the obtained virtual connection identifier.

Conversely, in transmitting/receiving a datagram to/from the ATM network without performing processing in the MAC layer, as shown in FIG. 4B, the router-a extracts an Ethernet frame from the information encapsulated in compliance with RFC1483 by reconstructing the received cells. Then, by referring to the lookup table of the virtual connection identifiers (VCIs) of the input ATM network and the DVLIs of the output Ethernet 17 using VCI=m as a key, the router-a determines the interface to which the extracted Ethernet frame is to be output and DVLI=y to be written in the frame, and then transmits the frame to the Ethernet 17. Thereafter, the router-b determines VCI=n and the output interface, corresponding to DVLI=y written in the received Ethernet frame. Subsequently, the frame is encapsulated in compliance with RFC1483 according to the predetermined link control information and is further converted into cells. The router-b then transmits the cells to the ATM network-b through the virtual connection of VCI=n.

The router according to the principle of the present invention transfers datagrams, which are to be transferred from one network through the router to another network, at a layer lower than layer-3 as described with reference to FIG. 4A or 4B. Additionally, the router according to the principle of the present invention transfers control information (for example, a Resource Management (RM) cell), which is to be terminated at a boundary of one network and conventionally not to be transferred outside of said one network, also at a layer lower than layer-3 as in FIG. 4A or 4B. According to the present invention, the control information is transferred from one router connected with one ATM network to another router connected with another ATM network via a non-ATM communication network, such as Ethernet or PPP link.

An example where an IP packet is transferred from the terminal-a to the terminal-b by utilizing the Controlled Load service (hereinafter referred to as the "CL service") in an IP packet communication network system is now described. In the CL service, a quality comparable to the best effort service under low load conditions is guaranteed, regardless of the level of the load in the communication network system. In providing the CL service in the Internet environment via an ATM network, the Available Bit Rate (ABR) service may be suitably employed in transferring ATM cells within the ATM network.

Figure 5:
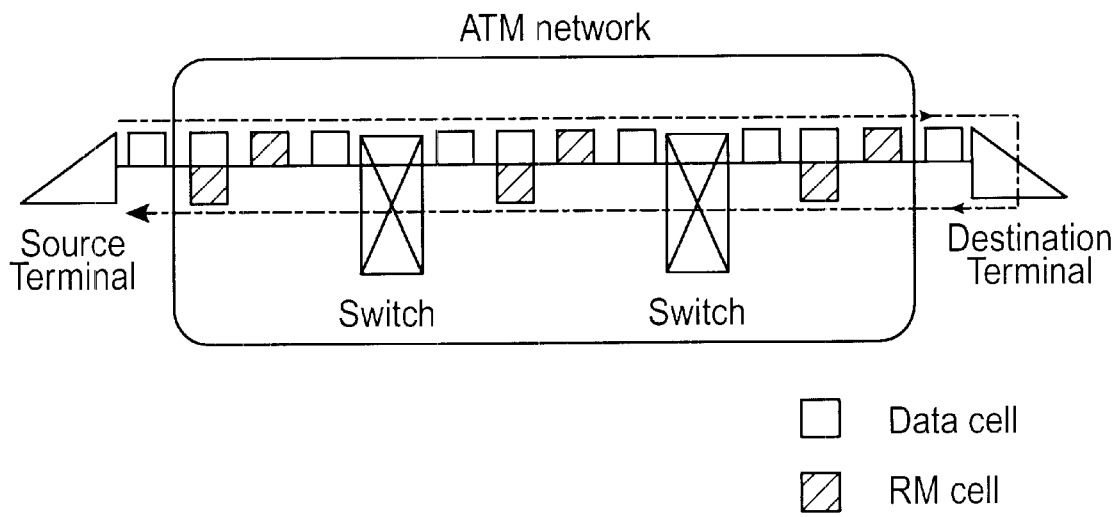
FIG. 5 illustrates the flow of an RM cell when the Available Bit Rate (ABR) service is provided.

In the ABR service, the cell transfer rate utilized in the source terminal of the ABR connection is adjusted in response to the congestion status of the ATM network, thereby achieving data transfer substantially free from cell loss. The current congestion status in the ATM network is notified to the source terminal through an RM cell. An RM cell is produced, as shown in FIG. 5, in the source terminal at a predetermined interval and is transmitted to the destination terminal of the ABR connection by using the same virtual connection as that of the data cells. In response to the RM cell, the destination terminal returns it to the source terminal. The above transmitted and returned RM cells pass through switches located between the source and destination terminals. Upon receiving the RM cell, a switch within each ATM network updates at least a part of the contents of the RM cell as required in order to report the current congestion status within the ATM network to the source terminal. The destination terminal may also perform the update on returning the RM cell. The contents of the RM cell are as follows:

Explicit Cell Rate (ER): indicating the maximum cell transfer rate at which the source terminal is capable of transmitting a cell.

Congestion Indication (CI): indicating the bit "1" or "0" representing the presence or the absence of congestion within the ATM network, and if the bit is "1", the source terminal reduces the cell transfer rate.

Not Increase (NI): if the bit is "1", the source terminal is unable to increase the cell transfer rate.

Moreover, the source terminal, which produces and transmits the RM cell, writes the following factor in the RM cell.

Current Cell Rate (CCR): the current cell transfer rate employed in the source terminal.

In this manner, by applying the ABR service such that cell loss that may be generated in the ATM network is suppressed as much as possible, reliable cell transfer is ensured regardless of the load condition of the ATM network. According to the foregoing description, in offering the CL service in the IP packet communication network system, the ABR service is preferably provided in the ATM network.

Next, a way to provide the CL service to IP packet transfer from the terminal-a to the terminal-b in the IP packet communication network system in which ATM networks are connected via the Ethernet or the PPP link, as illustrated in FIG. 2A or 2B, will be described.

Figure 6:
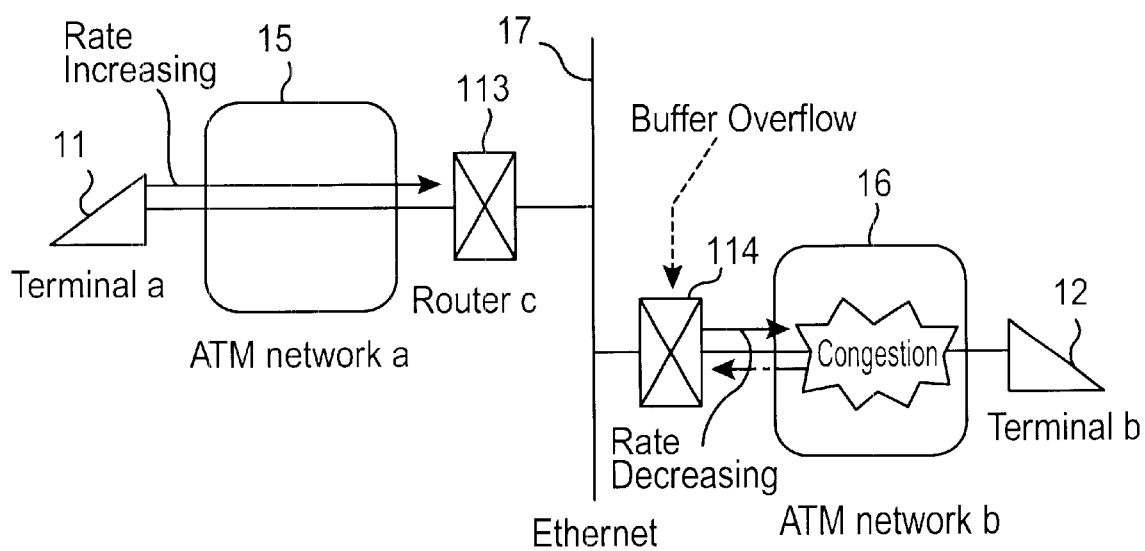
FIG. 6 explains a situation where a congestion occurs.

An ABR connection, which is a virtual connection that provides the ABR service, is established between the terminal-a and the router 113 in the ATM network-a, and another ABR connection is set between the router 114 and the terminal-b in the ATM network-b, as shown in FIG. 6. The ABR service is not provided between the routers 113 and 114 since they are not connected via the ATM network, but via the Ethernet (or the PPP link).

Figure 1A:
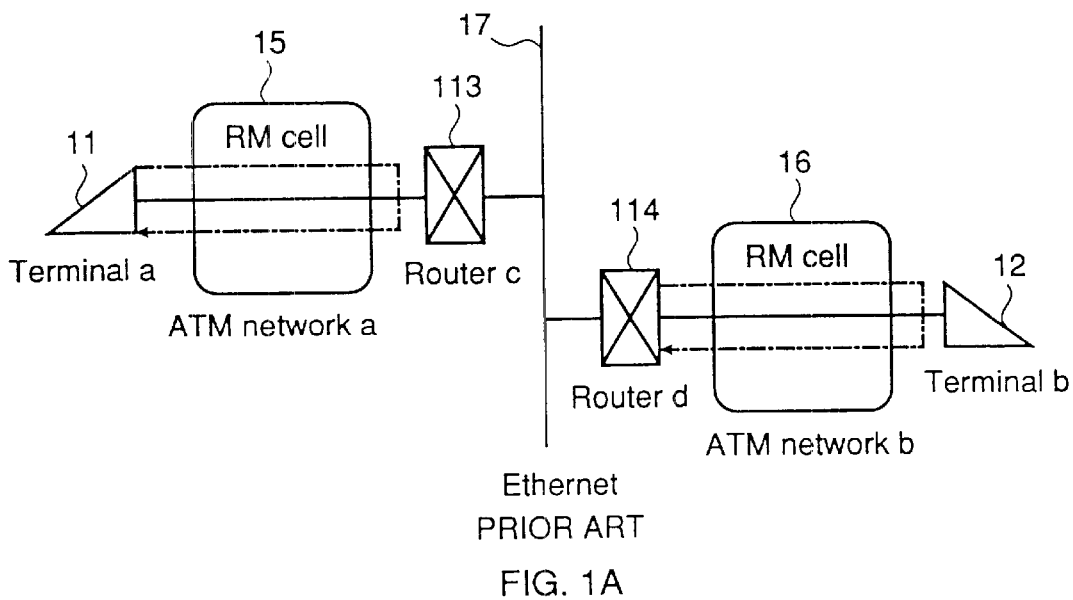
FIGS. 1A and 1B illustrate the flow of an RM cell according to a conventional technique.
Figure 1B:
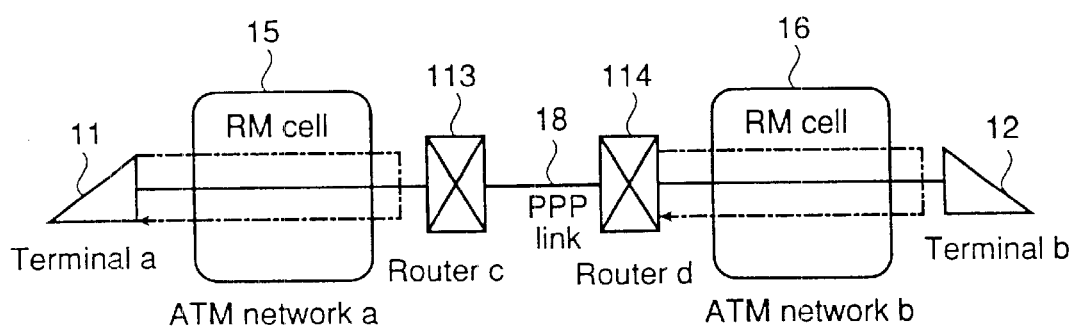

In a conventional technique, such as the one shown in FIGS. 1A and 1B, the ABR connection set within the ATM network a or b is independently operated from that set in the other ATM network b or a. Therefore, the RM cell information transferred on the ATM network-a is not made known to the ATM network-b, and vice versa, thereby failing to provide a sufficient level of service quality to communications between the terminals a and b. For example, any congestion occurring within the ATM network-b, as illustrated in FIG. 6, is reported to the router 114, which serves as the source node of the ABR connection in the ATM network-b, by the RM cell that is periodically transferred within the ATM network-b. Accordingly, the router 114 reduces the cell transfer rate. The ATM network-a is, however, unable to recognize the occurrence of congestion in the ATM network-b, and thus continues to increase the cell transfer rate if no congestion occurs in the ATM network-a. As a consequence, the cells transmitted to the router 114 from the ATM network-a via the Ethernet 17 are accumulated within the router 114 in a cell queue, due to the reduced cell transfer rate of the router 114, and in the worst case, an overflow of a buffer may be caused in the router 114. The similar situation will happen in the IP packet communication network system where the routers 113 and 114 are connected via the PPP link. This kind of decline of communication service quality will be severe especially in the network system where the routers perform data transfer at a layer lower than the network layer and thus do not perform packet transfer control in the network layer.

To overcome the above-described drawback, the present invention newly provides a mechanism for reporting RM cell information possessed by one ATM network which is providing the ABR service to another ATM network on the IP packet transfer route. This makes it possible to perform congestion control in one ATM network while considering RM cell information of another ATM network, thereby substantially preserving some transfer quality.

Figure 7A:
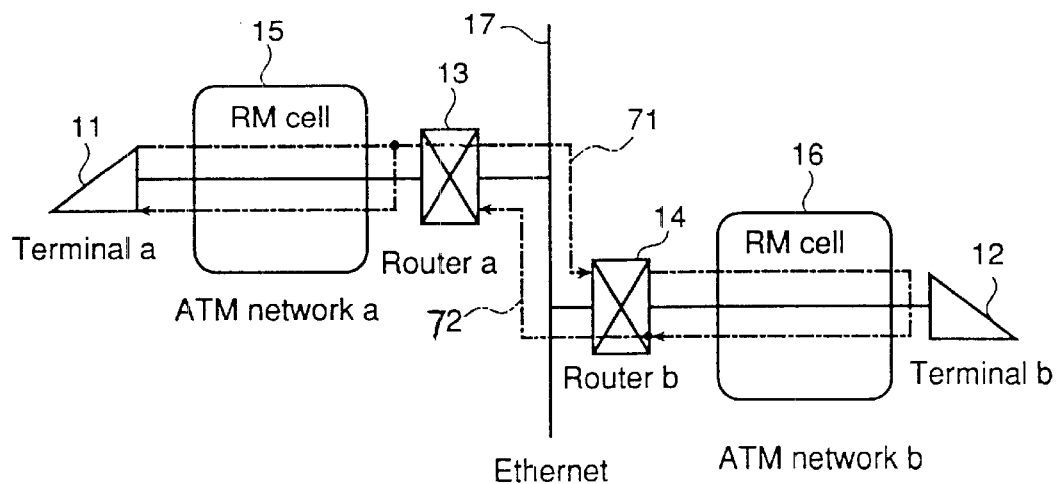
FIGS. 7A and 7B illustrate the flow of an RM cell according to the principle of the present invention.
Figure 7B:
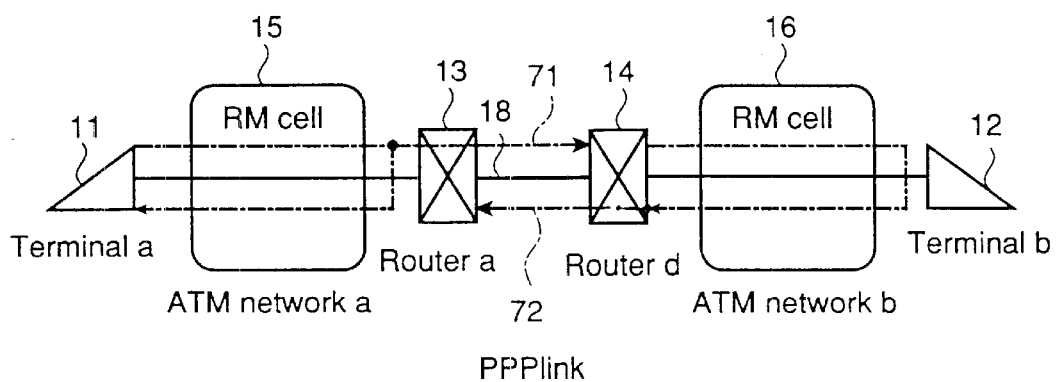

FIGS. 7A and 7B schematically illustrate the flow of RM cells when the present invention is applied to the IP packet communication network systems shown in FIGS. 2A and 2B, respectively. The router-a returns to the terminal-a the RM cell transmitted from the terminal-a, and additionally transmits a copy of the RM cell to the router-b via the Ethernet or the PPP link, as indicated by the one-dot-chain line represented by 71 of FIGS. 7A and 7B. The router-b transmits an RM cell to the terminal-b, and additionally, upon receiving the RM cell returned from the terminal-b, transmits a copy of the RM cell to the router-a via the Ethernet or the PPP link, as indicated by the one-dot-chain line represented by 72 of FIGS. 7A and 7B.

Moreover, the router-a in the ATM network-a, when receiving the RM cell 72 transmitted out of the ATM network-b via the Ethernet or the PPP link, terminates the received RM cell 72 to read the information contained in the received RM cell 72. Thereafter, the router-a, when returning an RM cell to the terminal-a, writes new control information according to the read information into the RM cell to be returned through the ATM network-a. Note that the new control information written into the RM cell to be returned to the terminal-a is determined based on not only the information contained in the RM cell transmitted from the terminal-a but also the information contained in the RM cell transmitted out of the ATM network-b via the Ethernet or the PPP link.

Similarly, the router-b in the ATM network-b, when receiving the RM cell 71 transmitted out of the ATM network-a via the Ethernet or the PPP link, terminates the received RM cell 71 to read the information contained in the received RM cell 71. Thereafter, the router-b, when transmitting an RM cell to the terminal-b, writes new control information according to the read information into the RM cell to be transmitted through the ATM network-b. Note that the new control information written into the RM cell to be transmitted to the terminal-b is determined based on not only the information contained in the RM cell returned from the terminal-b but also the information contained in the RM cell transmitted out of the ATM network-a via the Ethernet or the PPP link.

Figure 8:
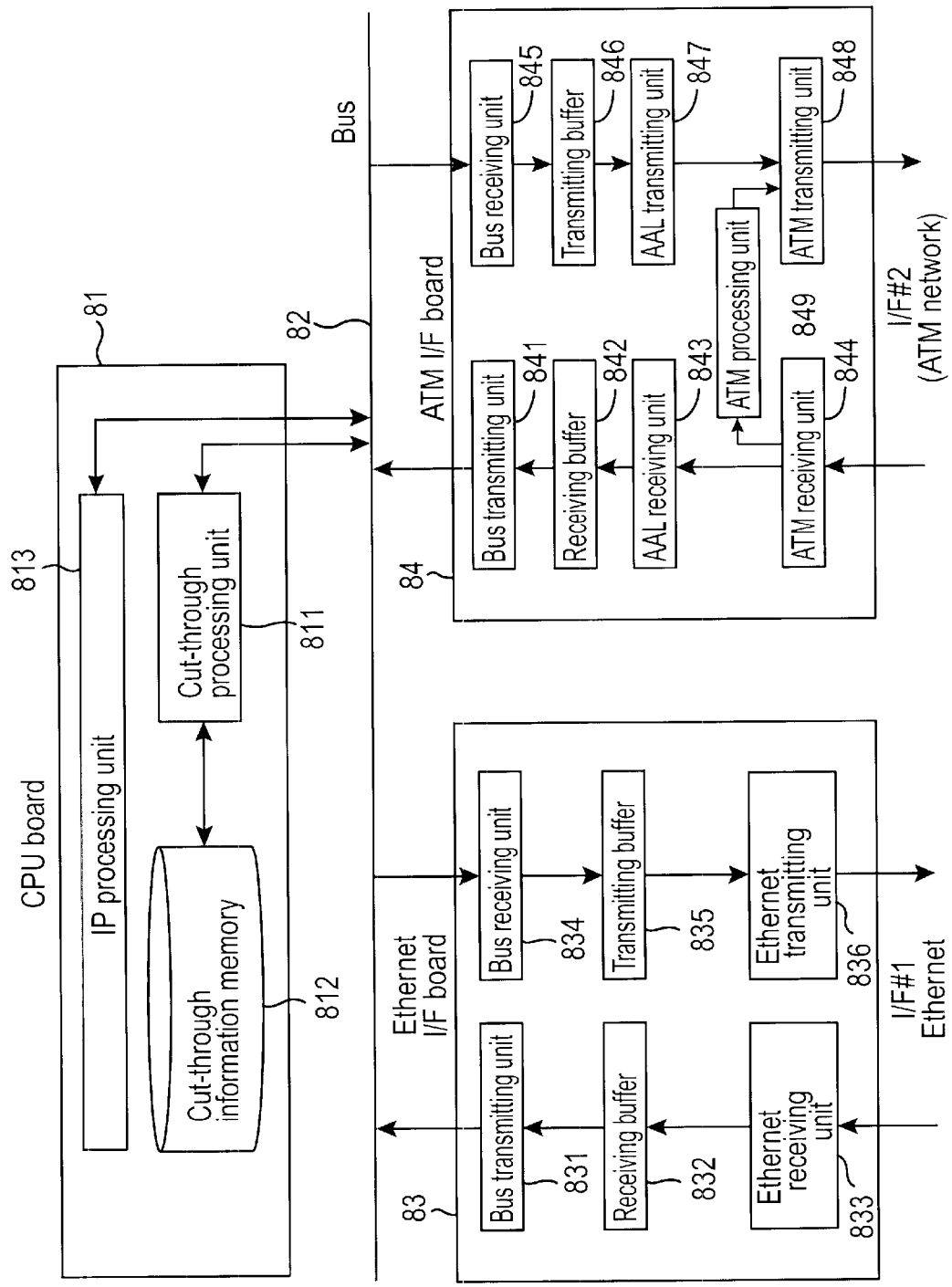
FIG. 8 illustrates an exemplary configuration of a router which can operate according to the principle of the present invention.

FIG. 8 illustrates an exemplary configuration of the router 13/14 that realizes the flow of RM cells as illustrated in FIG. 7A. In the router 13/14, an Ethernet interface board (I/F#1) 83 and an ATM interface board (I/F#2) 84 are connected to a bus 82. A CPU board 81 that performs IP processing and various control operations concerning DVL is further connected to the bus 82. Other interface boards may be suitably provided as required, though they are not shown.

In the above configuration, the router is connected with the Ethernet. However, a similar configuration applies to a router which is connected with a PPP link, as illustrated in FIG. 7B, except that a PPP link interface board is substituted for the Ethernet interface board 83 (the Ethernet receiving/transmitting unit is replaced by a PPP link receiving/transmitting unit).

The operation of the above-described router in an exemplary case where the router-a transfers an IP packet from the terminal-a destined to the terminal-b will be described below. In this case, the router-a is connected to the ATM network-a(15) via the I/F#2 and is also connected to the Ethernet 17 via the I/F#1.

A cell is transferred from the ATM network-a to an ATM receiving unit 844 in the I/F#2. If the received cell is a data cell, the cell is processed in the ATM Adaptation Layer (AAL) by an AAL receiving unit 843 and is then temporarily accumulated in a receiving buffer 842. In a case where transferring/receiving a datagram to/from the ATM network-a is performed through the MAC-layer processing as illustrated in FIG. 4A, after an Ethernet frame is reconstructed by executing predetermined processing in the MAC layer, the Ethernet frame is transmitted from the receiving buffer 842 to the bus 82 via a bus transmitting unit 841. Alternatively, in a case where transferring/receiving a datagram to/from the ATM network does not go through the MAC-layer processing as illustrated in FIG. 4B, after an Ethernet frame is generated from the RFC 1483 encapsulation information obtained by executing the AAL processing, the Ethernet frame is transmitted from the receiving buffer 842 to the bus 82 via a bus transmitting unit 841.

The CPU board 81 detects the presence of an Ethernet frame transmitted onto the bus 82, and then examines an input DVLI in the Ethernet frame in a case of FIG. 4A. In a case of FIG. 4B, the CPU board 81 examines an input Virtual Path Identifier/Virtual Connection Identifier (VPI/VCI) of the virtual connection through which the ATM cells of the Ethernet frame has been transferred to the ATM interface board 84. Then, based on the examined DVLI or VPI/VCI, a cut-through processing unit 811 checks for the corresponding entry in a cut-through information memory 812. The cut-through processing unit performs frame transfer at a layer lower than the network layer, and the cut-through information memory includes the DVLI lookup table indicating the relationship between input DVLIs (or VPI/VCIs) and output DVLIs (or VPI/VCIs).

If the corresponding entry is retrieved in the cut-through information memory 812, the cut-through processing unit 811 outputs the Ethernet frame with a data link header (e.g., the output DVLI) indicated in the corresponding entry, to the output target interface (I/F#1 in this example) which is indicated also in the corresponding entry. Thus, the frames are transferred without requiring IP-packet processing. An IP processing unit 813 has a function for exchanging messages with a next hop node and/or a previous hop node to register the relationship in the cut-through information table. The IP processing unit 813 may and may not have a function for transferring frames by IP forwarding (i.e., converting the frames into an IP packet and determining an output interface by analyzing a destination IP address of the IP packet) when the corresponding entry does not exist in the cut-through information memory 812.

When the frame to the I/F#1 is transmitted onto the bus 82 from the cutthrough processing unit 811, a bus receiving unit 834 receives the frame addressed to the I/F#1 and temporarily accumulated in a transmitting buffer 835. Subsequently, the frame is transmitted to the Ethernet 17 via an Ethernet transmitting unit 836.

The above-described operation similarly applies to the transfer operation from the Ethernet to the ATM network. For example, the router-b is connected to the Ethernet 17 via the I/F#1 and is also connected to the ATM network-b(16) via the I/F#2. An Ethernet frame is transmitted onto the bus 82 from the Ethernet interface board 83 (through an Ethernet receiving unit 833, a receiving buffer 832, and a bus transmitting unit 831). The cut-through processing unit 811 then processes the Ethernet frame referring to the cut-through information memory 812 to obtain an output interface and an output VPI/VCI (or DVLI) based on the input DVLI contained within the frame. Thereafter, the frame with the output VPI/VCI (or DVLI) is transferred to the ATM interface board 84, which serves as the output interface. The frame is then converted into an ATM cell in the ATM interface board 84 and is transmitted to the ATM network (through a bus receiving unit 845, a transmitting buffer 846, an AAL transmitting unit 847, and an ATM transmitting unit 848).

A description below now focused on the procedure of processing an RM cell in the routers a and b in transmitting an IP packet from the terminal-a to the terminal-b. An ABR connection is established between the terminal-a and the router-a in the ATM network-a and another ABR connection is set between the router-b and the terminal-b in the ATM network-b. With regard to the data cells excluding RM cells transferred through these ABR connections, the routers a and b respectively perform the above-described processing.

Upon receiving a cell transmitted from the terminal-a, the ATM receiving unit 844 of the router-a determines whether the received cell is an RM cell or a data cell. If it is determined to be the RM cell, the router-a, which serves as the destination node of the ABR connection in the ATM network-a, returns the RM cell as a backward RM cell to the terminal-a by using an ATM processing unit 849 in a manner similar to the normal ABR service. Additionally, a copy of the RM cell is created and sequentially delivered to the AAL receiving unit 843 and to the receiving buffer 842. After the copy of the RM cell is converted into an Ethernet frame, it is transmitted onto the bus 82 via the bus transmitting unit 841.

In forming the Ethernet frame out of the received RM cell, a frame header (for example, MAC address and DVLI) and a frame trailer to be provided for the frame including the received RM cell information are determined, based on the header and the trailer provided for the data cells transferred through the same virtual connection. This may be achieved by storing a table, such as the one shown in FIG. 9, in the receiving buffer 842 where the received cell is formed into an Ethernet frame. In this table, the relationship between the virtual connection identifier (VCI) assigned to each input cell and the above-described frame information is stored. Thus, upon receiving an RM cell, the header information and the trailer information are provided for the RM cell by referring to this table, thereby forming an Ethernet frame out of the RM cell.

To distinguish a frame containing an RM cell from that of a data cell, it is preferable that the above Ethernet frame contains information that easily indicates whether it has been formed from an RM cell. An example of a technique to achieve the above is as follows. Within the MAC address field of the Ethernet frame (six bytes), which contains DVLI, one bit may be assigned as "RM bit" to the information indicating whether the frame has been formed from an RM cell, as illustrated in FIG. 10. Then, a node in the Ethernet that receives the frame can easily identify that the received frame contains RM cell information by referring to this RM bit. In addition to the RM bit, the I/G bit, which indicates whether the frame contains a uni-cast address or a multicast address, and the U/L bit, which represents whether the frame includes a universally defined address or a locally defined address, are written in the MAC address field. In FIG. 10, "1" is written as the U/L bit since the DVLI is inserted into the MAC address field as the locally defined value, in this example. AS a consequence, the DVLI is expressed by the remaining 45 bits by subtracting the RM bit, the I/G bit, and the U/L bit from six bytes, in this example.

The RM cell, which has been formed into an Ethernet frame in the above manner, is processed in the cut-through processing unit 811 based on the input DVLI, which is given to the frame in the input ATM interface board 84. Then the cut-through processing unit 811 transmits the frame to the Ethernet interface board 83 (IF#1), which serves as the output interface, connected to the Ethernet 17. In the I/F#1, the frame is sequentially transferred to the bus receiving unit 834 and the transmitting buffer 835 and is then transmitted to the Ethernet 17 via the Ethernet transmitting unit 836.

In the router-b, which has received the frame containing the RM cell information from the Ethernet 17, the cut-through processing unit 811 determines the ATM interface board 84, which serves as the output interface, based on the DVLI contained in the frame received via the Ethernet interface board 83. The frame is then transferred to the ATM interface board 84. The ATM interface board 84 is configured to determine whether the frame has been formed from an RM cell. The RM bit in the frame accumulated in the transmitting buffer 846 can be used for this determination. If the board 84 determines that the frame has been formed from an RM cell, the RM cell information is extracted from the frame. The AAL transmitting unit 847 or the ATM transmitting unit 848 within the ATM interface board 84 can extract the RM cell information that has been generated in the ATM network-a and store it in the ATM transmitting unit 848 or the ATM processing unit 849. The RM cell generated in the ATM network-a and contained in the received frame, as itself, is not transmitted to the ATM network-b. However, the contents of an RM cell transferred within one network(b) are influenced by the information of the RM cell generated in another network(a) as follows.

The RM information stored in the ATM transmitting unit 848 or the ATM processing unit 849 in the router-b will be referred to, when the router-b (specifically, the ATM transmitting unit 848), which serves as the transmitting node of the ABR connection set in the ATM network-b, generates a forward RM cell and transmits it through the ABR connection. For example, the Current Cell Rate (CCR) contained in the frame of the RM cell received from the ATM network-a is examined. If the current cell transfer rate in the router-b is greater than the examined CCR, the CCR included in the forward RM cell to be transferred to the ABR connection in the ATM network-b is changed into the CCR contained in the frame of the RM cell received from the ATM network-a. In this manner, the cell transfer rate of the router-b can be set not to exceed the CCR in the received frame of the RM cell.

As described above, the RM cell information (CCR) within the ATM network-a, which is a transmitting side network, is delivered to the different ATM network-b, which is a receiving side network. Thus, the ATM network-b can know the current cell transfer rate (CCR) of the ATM network-a, and can control the cell transfer rate in the ATM network-b to be not higher than the CCR. As a result, the ATM network-b can prevent a waste of network resource in transferring cells through the ABR connection.

In the ABR connection established in the ATM network-b, which is for transferring an IP packet from the terminal-a to the terminal-b, and where the router-b is the source node and the terminal-b is the destination node of the ABR connection, the RM cell generated at the router-b and transmitted to the terminal-b is returned from the terminal-b and is received by the ATM receiving unit 844 of the router-b, as a backward RM cell.

When the ATM receiving unit 844 of the router-b determines that the received cell is a backward RM cell, the received RM cell is transferred to the ATM processing unit 849 for generating a new forward RM cell to be transmitted to the terminal-b based on the information contained in the backward RM cell in a manner similar to the normal ABR service. Additionally, the ATM receiving unit 844 creates a copy of the backward RM cell and sequentially delivers the copy to the AAL receiving unit 843 and to the receiving buffer 842 in which the cell is formed into an Ethernet frame. In forming an Ethernet frame out of the copy of the backward RM cell, the foregoing processing executed by the router-a for transferring the forward RM cell in the ATM network-a to the Ethernet is similarly performed. The frame formed out of the backward RM cell is then transferred to the Ethernet interface board 83 via the cut-through processing unit 811 within the CPU board 81 by referring the cut-through information memory 812 based on the input DVLI contained in the frame, and is further transmitted to the Ethernet 17.

The router-a then receives the frame including the backward RM cell information of the ATM network-b through the Ethernet 17, and the frame is further delivered, via the cut-through processing unit 811 within the CPU board 81, to the ATM interface board 84, by referring to the cut-through information memory 812 based on the DVLI included in the received frame. The ATM interface board 84 serves as the output interface, connected to the ATM network-a. When the ATM interface board 84 recognizes that the received frame has been formed from an RM cell, the ATM transmitting unit 848 reads out of the delivered frame the backward RM cell information generated in the ATM network-b and stores it in the ATM transmitting unit 848 or the ATM processing unit 849. The backward RM cell generated in the ATM network-b and contained in the received frame, as itself, is not transmitted to the ATM network-a. However, the contents of an RM cell transferred within one network(a) are influenced by the information of the RM cell (backward RM cell) generated in another network(b) as follows.

The backward RM cell information stored in the ATM transmitting unit 848 or the ATM processing unit 849 will be referred to, when the ATM receiving unit 844 of the router-a, which serves as the destination node of the ABR connection set in the ATM network-a, receives a forward RM cell from the terminal-a and the ATM processing unit 849 returns a backward RM cell to the terminal-a through the ATM transmitting unit 848 in response to the forward RM cell. For example, suppose the backward RM cell information received from the ATM network-b through the Ethernet is expressed by ERb, CIb, and NIb, and the forward RM cell information received from the ATM network-a directly is expressed by ERa, Cia, NIa, the respective elements of the RM cell which is to be returned to the terminal-a are determined as follows:

ER=min (ERa, ERb)

CI=CIa|CIb

NI=NIa|NIb where | indicates an OR operator.

In this manner, the RM cell information (ER, CI, and NI) within the ATM network-b, which is a receiving side network, is delivered to the different ATM network-a, which is a transmitting side network. Thus, the ATM network-a can know the current congestion status in the ATM network-b, and can determine the cell transfer rate in the ATM network-a while taking the congestion status in the ATM network-b into consideration. As a consequence, the ATM network-a can cooperate to prevent a transfer delay increasing or a buffer overflow in the transmitting node (router-b) of the ATM network-b.

FIG. 11 is a flowchart illustrating an exemplary operation algorithm used in the ATM receiving unit 844. In step S91, the ATM receiving unit 844 receives a cell from the ATM network. Then, in step S92, it determines whether the received cell is a data cell or an RM cell. If it is found in step S92 that the received cell is a data cell, the process proceeds to step S96 in which the cell is formed into a frame and is transmitted to another network toward the destination terminal by performing data link processing (or IP processing if required). If it is found in step S92 that the cell is an RM cell, the ATM receiving unit 844 checks, in step S93, the DIR which indicates the transfer direction of the cell. If DIR indicates "0", the RM cell has been transmitted in the direction to the receiving(destination) node of the data cell (i.e. the RM cell is a forward RM cell) and thus is to be returned to the source node of the ABR connection. On returning the RM cell through the ATM processing unit 849 and ATM transmitting unit 848, in step S94, DIR should be changed to "1" in order to indicate that the RM cell is transmitted in the direction to the transmitting(source) node of the data cell. Also, on returning the RM cell, if the backward RM cell information of another ATM network is stored, the contents of the RM cell to be returned may be changed based on the backward RM cell information. If DIR indicates "1", the received RM cell is a backward RM cell.

In a case where network topology information stored in the ATM receiving unit 844, it is preferable to determine, as in step S95, whether there is any other ATM network between the router provided with this ATM receiving unit 844 and a destination terminal of a network-layer packet, when the received cell is the forward RM cell. Also, it is preferable, when the received cell is the backward RM cell, to determine whether there is any other ATM network between the router provided with this ATM receiving unit 844 and a source terminal of a network-layer packet, if possible. The transmission of the frame including the RM cell can comply with necessity of the RM information in other networks, when the process proceeds to step S96 if the answer of step S95 is yes and otherwise the RM cell is terminated at the router.

In step S96, the RM cell (either the forward RM cell or the backward RM cell) is formed into a frame by performing data link processing, and is transmitted to another network via the output interface.

If ABR control is performed in the source/destination terminal of the networklayer packet, the frame including the RM cell is desirably transmitted toward the source/destination terminal even if it is determined in step S95 that there is no ATM network between the terminal and the router.

In the foregoing embodiment, communications between the routers are made via the Ethernet or the PPP link. In the present invention, however, another type of communication network other than the ATM network may be used for performing communications between the routers. Also, the ATM network in the foregoing embodiment can be replaced by another type of virtual connection-oriented network where the control information similar to the RM cell is exchanged regarding the virtual connection, within the scope of the present invention.

The functions of the units in FIG. 8 may be achieved by either software or hardware, or any combination of software and hardware. Also, the above described embodiment according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art. Such a software package can be a computer program product that employs a storage medium including stored computer code which is used to program a computer to perform the disclosed function and process of the present invention.

In addition to those already mentioned above, persons of ordinary skill will realize that many modifications and variations of the above embodiments may be made without departing from the novel and advantageous features of the present invention.

Accordingly, all such modifications and variations are intended to be included within the scope of the appended claims. The specification and examples are only exemplary. The following claims define the true scope and sprit of the invention.

What is claimed is:

1. A network interconnection apparatus for connecting a first network and a second network, comprising:

a memory configured to store an identifier of a virtual connection in the first network to be used in receiving a frame belonging to a specified flow and corresponding information for designating a neighboring node in the second network to which the frame from the virtual connection is to be transferred;

a transfer unit configured to transfer the frame from the virtual connection to the neighboring node by referring to the memory at a layer lower than a network layer; and a control-frame processing unit configured to terminate a control frame received from the virtual connection so as to perform resource management in a datalink layer within the first network, and configured to create a copy of the control frame so as to transfer the copy of the control frame to the neighboring node through the transfer unit.

2. The apparatus according to claim 1, wherein the memory stores an identifier of a virtual data link dedicated to the specified flow in the second network as the corresponding information, and the transfer unit writes the identifier of the virtual data link into a prescribed field in the frame to be transferred.

3. The apparatus according to claim 1, wherein the memory stores an address of the neighboring node as the corresponding information, and the transfer unit writes the address of the neighboring node into a destination datalink address field in the frame to be transferred.

4. The apparatus according to claim 1, wherein the control-frame processing unit terminates the received control frame by returning a backward control frame based on the received control frame to a sourceside node of the virtual connection within the first network.

5. The apparatus according to claim 1, wherein the control-frame processing unit terminates the received control frame and transmits a new forward control frame based on the received control frame to a destination-side node of the virtual connection within the first network.

6. The apparatus according to claim 1, wherein the control-frame processing unit creates the copy of the control frame when a third network where resource management in the datalink layer is performed according to a control frame exists between the second network and a terminal which is to receive the frame.

7. The apparatus according to claim 6, wherein the first and the third networks are virtual-connection-oriented networks.

8. The apparatus according to claim 1, where in the control-frame processing unit creates the copy of the control frame when a terminal which is to receive the frame has a function for performing resource management in the datalink layer according to a control frame.

9. The apparatus according to claim 1, wherein the first network is a virtual-connection-oriented network and the second network is a connection-less-type network.

10. The apparatus according to claim 1, further comprising another transfer unit configured to transfer a packet formed out of a received frame to a neighboring node at the network layer, when an identifier of a virtual connection from which said received frame is received is not stored in the memory.

11. A network interconnection apparatus for connecting a first network and a second network, comprising:

a memory configured to store an identifier of a virtual data link dedicated to a specified flow in the first network and a corresponding identifier of a virtual connection to a neighboring node in the second network;

a receiving unit configured to receive a frame including a control frame with the identifier of the virtual data link from the first network, the control frame generated in a third network where resource management in a datalink layer is performed according to the control frame; and a control-frame processing unit configured to transmit another control frame to the neighboring node through the virtual connection so as to perform resource management in the datalink layer within the second network, and configured to determine information to be written into said another control frame according to said control frame included in the frame received by the receiving unit.

12. The apparatus according to claim 11, further comprising a transfer unit configured to transfer a frame not including the control frame with the identifier of the virtual data link to the neighboring node through the virtual connection by referring to the memory at a layer lower than a network layer.

13. The apparatus according to claim 12, wherein the control-frame processing unit reads a current frame transfer rate in the third network out of said control frame, and the transfer unit transfers a frame at a transfer rate not higher than the read current frame transfer rate, when the control frame is transferred in a forward direction.

14. The apparatus according to claim 13, wherein the control-frame processing unit writes said transfer rate used in the transfer unit into said another control frame.

15. The apparatus according to claim 11, wherein the control-frame processing unit reads out of said control frame at least one of an information of a maximum frame transfer rate at which a transmitting node in the third network is allowed to transmit a frame, an information indicating a congestion in the third network, and an information indicating whether it is allowable to increase a frame transfer rate at the transmitting node in the third network, and writes the read information into said another control frame, when the control frame is transferred in a backward direction.

16. The apparatus according to claim 11, wherein the first and the third networks are virtual-connection-oriented networks and the second network is a connection-less-type network.

17. A method of processing a control frame at a boundary of first and second networks, the method comprising steps of:

storing, in a memory, an identifier of a virtual connection in the first network to be used in receiving a frame belonging to a specified flow and corresponding information for designating a neighboring node in the second network to which the frame from the virtual connection is to be transferred;

terminating a control frame received from the virtual connection so as to perform resource management in a datalink layer within the first network, while creating a copy of the control frame; and transferring the copy of the control frame to the neighboring node by referring to the memory at a layer lower than a network layer.

18. A method of processing a control frame at a boundary of first and second networks, the method comprising steps of:

storing, in a memory, an identifier of a virtual data link dedicated to a specified flow in the first network and a corresponding identifier of a virtual connection to a neighboring node in the second network;

receiving a frame including a control frame with the identifier of the virtual data link from the first network, the control frame generated in a third network where resource management in a datalink layer is performed according to the control frame; and transmitting another control frame to the neighboring node through the virtual connection so as to perform resource management in the datalink layer within the second network, while determining information to be written into said another control frame according to said control frame included in the received frame.

19. A method of processing a control frame to be transferred in a forward direction in a network system including first, second, and third networks, the method comprising steps of:

storing, in a first memory at an egress of the first network, an identifier of a first virtual connection in the first network to be used in receiving a frame belonging to a specified flow and corresponding information for designating a next hop node in the second network to which the frame from the first virtual connection is to be transferred;

returning a first control frame received from the first virtual connection so as to perform resource management in a datalink layer within the first network, while creating a copy of the first control frame, at the egress of the first network;

transferring a frame including the copy of the first control frame and another frame from the first virtual connection in the first network to the next hop node in the second network by referring to the first memory at a layer lower than a network layer;

storing, in a second memory at an ingress of the third network, an identifier of a virtual data link dedicated to the specified flow in the second or other network and a corresponding identifier of a second virtual connection for the specified flow in the third network;

receiving said frame including the copy of the first control frame with the identifier of the virtual data link from the second or other network and transmitting a second control frame onto the second virtual connection so as to perform resource management in the datalink layer within the third network, while determining information to be written into the second control frame according to the first control frame, at the ingress of the third network; and transferring said another frame with the identifier of the virtual data link onto the second virtual connection by referring to the second memory at a layer lower than a network layer.

20. A method of processing a control frame to be transferred in a backward direction in a network system including first, second, and third networks, the method comprising steps of:

storing, in a first memory at an ingress of the third network, an identifier of a first virtual connection in the third network to be used in receiving a frame belonging to a specified flow and corresponding information for designating a neighboring node in the second network to which the frame from the first virtual connection is to be transferred;

terminating a first control frame received from the first virtual connection so as to perform resource management in a datalink layer within the third network, while creating a copy of the first control frame, at the ingress of the third network;

transmitting a frame including the copy of the first control frame to the neighboring node in the second network by referring to the first memory;

storing, in a second memory at an egress of the first network, an identifier of a virtual data link dedicated to the specified flow in the second or other network and a corresponding identifier of a second virtual connection for the specified flow in the first network;

receiving said frame including the copy of the first control frame with the identifier of the virtual data link from the second or other network; and returning a second control frame received from the second virtual connection so as to perform resource management in the datalink layer within the first network, while determining information to be written into the second control frame according to the first control frame, at the egress of the first network.

* * * * *